(12) United States Patent
Bain et al.

(10) Patent No.: US 6,978,418 B1
(45) Date of Patent: Dec. 20, 2005

(54) DYNAMIC-ADAPTIVE CLIENT-SIDE IMAGE MAP

(75) Inventors: Lawrence M. Bain, Mountain View, CA (US); David E. Waller, Scotts Valley, CA (US); Thomas Wang, Cupertino, CA (US); Andrew H. Mutz, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/298,453

(22) Filed: Apr. 13, 1999

(51) Int. Cl.$^7$ .......................................... G06F 15/00
(52) U.S. Cl. ................................. 715/501.1; 715/500
(58) Field of Search ............................ 707/513, 501.1; 345/861; 715/513, 501.1, 781, 500

(56) References Cited

U.S. PATENT DOCUMENTS

| | | | |
|---|---|---|---|
| 5,801,679 A * | 9/1998 | McCain ...................... 345/723 |
| 5,929,849 A * | 7/1999 | Kikinis ....................... 345/700 |
| 5,968,120 A * | 10/1999 | Guedalia .................... 709/219 |
| 6,034,689 A * | 3/2000 | White et al. ................ 345/760 |
| 6,061,686 A * | 5/2000 | Gauvin et al. ................ 707/10 |
| 6,121,970 A * | 9/2000 | Guedalia .................... 345/760 |
| 6,141,018 A * | 10/2000 | Beri et al. ................... 345/473 |
| 6,161,126 A * | 12/2000 | Wies et al. .................. 709/203 |
| 6,247,133 B1 * | 6/2001 | Palage et al. ................ 713/201 |
| 6,271,840 B1 * | 8/2001 | Finseth et al. ............... 715/513 |
| 6,324,553 B1 * | 11/2001 | Cragun et al. ............ 707/501.1 |
| 6,324,554 B1 * | 11/2001 | Watanabe et al. ........... 715/517 |
| 6,353,850 B1 * | 3/2002 | Wies et al. .................. 345/731 |
| 6,356,283 B1 * | 3/2002 | Guedalia .................... 345/760 |
| 6,366,899 B1 * | 4/2002 | Kernz ......................... 700/225 |
| 6,405,221 B1 * | 6/2002 | Levine et al. ............. 715/501.1 |
| 6,415,307 B2 * | 7/2002 | Jones et al. ................. 715/525 |
| 6,542,255 B1 * | 4/2003 | Nakamura ................. 358/1.17 |
| 6,640,010 B2 * | 10/2003 | Seeger et al. ............... 382/229 |
| 6,665,573 B1 * | 12/2003 | Blackman ................... 700/116 |
| 6,803,930 B1 * | 10/2004 | Simonson ................... 715/784 |

OTHER PUBLICATIONS

Java Boutique website, EuroCalc, http://javaboutique.internet.com/joybutton/, Jan. 29, 1999, Internet prints, pp. 1-3.*
Java Boutique website, Joybutton, http://javaboutique.internet.com/joybutton/, Jan. 29, 1999, Internet prints, pp. 1-3.*

* cited by examiner

Primary Examiner—Cong-Lac Huynh

(57) ABSTRACT

A method and system for associating active regions with positions within displayed images in a device and display independent manner. Active regions are described by client-side image maps include in hyper-text markup language descriptions of web pages that include specifications of images to be displayed within the web pages. The specifications of images and descriptions of client-side image maps are replaced by servers with a parameterized call to an image viewer, invoked by a browser on a client computer to display the image. The browser maintains an internal description of the positions of active regions in image-relative coordinates, thereby providing dynamic viewing of web pages that include images with associated active regions while maintaining the originally-defined correspondence between the active regions and images.

17 Claims, 8 Drawing Sheets

DYNAMIC-ADAPTIVE CLIENT-SIDE IMAGE MAP

TECHNICAL FIELD

The present invention relates to the display of dynamic images within web pages by web-page display software, including web browsers, and, in particular, to a method and system that provide client-side image maps that specify active regions that are dynamic and resolution-independent.

BACKGROUND OF THE INVENTION

During the past five years, the Internet has emerged as a major communications medium for transmission of information to wide audiences. Initially developed for the exchange of simple, text-based messages and computer files between users of geographically separated mainframe and mini computers, the Internet has evolved into an important communications link between home personal computer ("PC") users and a broad array of information provides, including governmental and non-profit organizations, commercial organizations, traditional broadcast information providers and other home PC users.

Currently, the most popular method of information exchange on the Internet is transfer of web pages described in hypertext mark-up language ("HTML") files via the hypertext transfer protocol ("HTTP"). A web browser software program running on a user's PC requests a web page from a server computer via the Internet by sending a uniform resource locator ("URL") to the server computer that compactly specifies, in a character string, a particular HTML file. The server computer responds by returning a file containing the HTML description of the requested web page. The browser on the user's computer then interprets the HTML description of the web page contained in the returned file and transforms it into a graphical display on the monitor of the user's PC.

As the machine-level and software-level graphics capabilities of PCs have increased, web page designers and providers of web page development tools are incorporating enhanced graphics display capabilities into web page descriptions. As one example, web page designers are able to designate portions of bit map images displayed within a web page as being "hot," or active. A web page designer may associate any of a number of different actions with each active region within a web page. When a user manipulates a mouse to move a displayed cursor over an active region, or inputs a mouse click to a PC while a displayed cursor is positioned over an active region, the associated action will be carried out. Actions may include displaying a web page or image, or invoking a software routine. The designation of active regions, and the association of actions with active regions, is accomplished through the use of server-side image maps and client-side image maps. Image maps can be thought of as the superposition of an abstract template over an image included on the web page, with the abstract template containing descriptions of the size, shape, and location of each active region as well as an association between the active region and an action. Server-side image maps are implemented on a server computer, requiring a browser running on a client computer receiving the web page to transmit input events during display of the web page back to the server computer, followed by transmission of responses from the server computer to the client computer that facilitate any actions invoked by user input. Client-side image maps, by contrast, are implemented, at run time, by web browsers, or by viewers invoked by web browsers, on client computers. Input to displayed images associated with client-side image maps thus does not incur the extra Internet traffic incurred in displaying images associated with server-side image maps.

Dynamically sizable and shiftable images within web pages are another example of recent enhanced graphic capabilities of web pages. A user viewing the display of a dynamic image within a web page may direct the browser to zoom into or out from the image to higher and lower resolutions, and to scroll the image in vertical and horizontal directions. The software mechanisms for describing and implementing dynamic images within web pages are currently separate and distinct from the mechanisms for describing and implementing client-side image maps.

Yet another example of recent enhanced capabilities of web pages is the ability to include within a web page description one or more invocations of software routines that run on the computer system on which the web page is displayed. Invocation of programs can provide extremely dynamic graphical displays. For example, a program can be invoked during display of a first web page that then requests, receives, and displays additional web pages or images in order to provide a sequence of discrete graphical displays.

While all three of the above-described, recent graphical display enhancements available to web page designers are commonly used, they are currently poorly integrated with one another. For example, active regions are designated in currently-available client-side image maps in terms of resolution-dependent device coordinates. As a result, when client-side image maps are associated with dynamic images within web pages, the active regions are not automatically zoomed and shifted, or panned, along with the dynamic images. As a result, the active regions defined within the client-side image maps quickly lose their original correspondence to specific regions of the images with which they are associated. Another example of the poor integration between the above-mentioned enhanced graphics capabilities is that there is currently no easy way for programs invoked form web pages to acquire information about active regions from client-side image maps defined within web page descriptions. Therefore, when an invoked program obtains and displays a second image, it is currently difficult or impossible for the invoked program to correlate the second displayed image with active regions defined for that image in a client-side image map. For these reasons, web page designers and providers of web page development tools have recognized the need for integrated methods and systems to allow client-side image maps, dynamic images within web pages, and software routines invoked from web pages to easily and effectively inter-operate with one another.

SUMMARY OF THE INVENTION

The present invention relates to methods and systems for associating active regions with positions within displayed images in a device and display independent manner. In a number of current implementations, active regions are described by client-side image maps including in HTML descriptions of web pages that include specifications of images to be displayed within the web pages.

One embodiment of the present invention provides a method and system for implementing dynamic-adaptive client-side image maps that automatically track changes in a displayed dynamic image within a web page in order to maintain the originally specified correspondence between active regions defined by the dynamic-adaptive client-side image map and regions of the associated image displayed as part of the web page. In addition, the dynamic-adaptive client-side image map definitions are accessible to software routines invoked from web pages. In this embodiment of the present invention, an adaptive delivery module running on a server computer determines the capabilities of a client computer requesting a web page and, when the requesting computer's capabilities are compatible with inclusion of a dynamic-adaptive client-side image map, the adaptive delivery module transforms the HTML description of the requested web page to include one or more dynamic-adaptive client-side image maps and transmits the transformed HTML description of the web page to the requesting client computer. A web browser running on the requesting client computer receives the transformed web page and instantiates an appropriate image viewer based on tags within the transformed HTML description of the web page. The web browser provides the instantiated viewer with parameters describing any dynamic-adaptive client-side image maps within the transformed HTML description of the web page, and the instantiated viewer then processes the parameters to produce data structures that describe active regions within the image displayed by the viewer as part of the total display of the web page. The information contained within the data structure can be used at run time, during the display of the web page, by the instantiated viewer to correlate user input with active regions of the displayed image. The server-side adaptive delivery module parses standard HTML client-side image map descriptions to produce transformed HTML web page descriptions. Thus, web page designers can enjoy the enhanced capabilities provided by dynamic-adaptive client-side image maps without learning and employing new HTML constructs. In order to make use of dynamic-adaptive client-side image maps, the web page designer needs only to include one additional tag in the HTML specification of an image. When the web page is served by a server that includes an adaptive delivery module, and when the served web page is displayed on a computer with a browser and associated viewers capable of processing dynamic-adaptive client-side image maps, the maintenance of the originally specified between correlation of active areas defined in the dynamic-adaptive client-side image maps and regions of displayed images occurs automatically.

DETAILED DESCRIPTION OF THE INVENTION

One embodiment of the present invention comprises an adaptive delivery module on a server computer and an enhanced web browser with enhanced associated image viewers on a client computer. When the browser running on the client computer requests a web page that includes images and associated client-side image maps from the server computer, and when the client computer includes the enhanced web browser and associated enhanced image viewers, the adaptive delivery module running on the server computer transforms an HTML description of the requested web page to include one or more dynamic-adaptive client-side image maps and enhanced viewer invocations. The adaptive delivery module then transmits the transformed HTML web page description to the client computer where it is displayed by the enhanced browser and enhanced image viewer. When the displayed web page contains dynamic images, a user viewing the web page may alter the display of the images within the web page by zooming and scrolling operations. The enhanced viewer on the client computer maintains defined relationships between active regions described by the dynamic-adaptive client-side image maps and regions of displayed images during user-initiated image display alterations, and correlates user input to active regions with actions associated with the active regions defined by the dynamic-adaptive client-side image maps. Use of dynamic-adaptive client-side image maps by web page designers does not involve learning and employing new HTML constructs, or creation of special HTML scripts or programs for tracking and adjusting active regions during display alteration operations, but instead can be accomplished by simply including an OpenPix image tag attribute within the HTML description of the image to be displayed.

Figure 1:
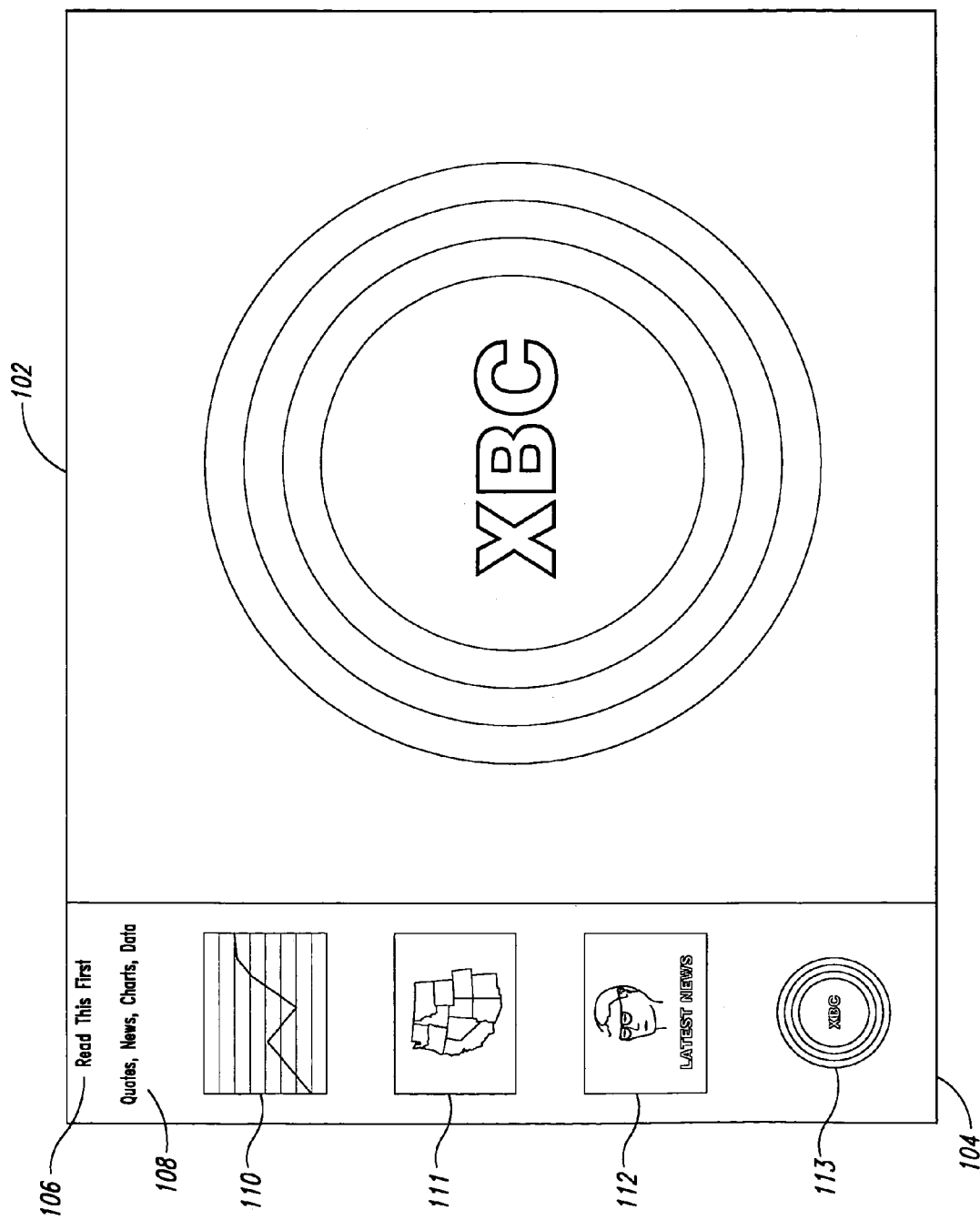
FIG. 1 shows an example web page displayed on the display monitor of a client computer.

FIG. 1 shows a web page displayed on the monitor of a client computer. The web page includes a large graphical image 102 representing the logo of a hypothetical "XBC" Corporation. A column 104 on the left hand side of the web page is a separate image that includes: (1) a "Read This First" text line 106; (2) a "Quotes, News, Charts, Data" text line 108; and (3) a number of additional charts and figures 110–113. Thus the displayed web page of FIG. 1 comprises two rectangular images: a large logo-containing image 102 and a smaller complex image 104. Note that the text lines 106 and 108 are part of a larger graphical image 102.

Figure 2:
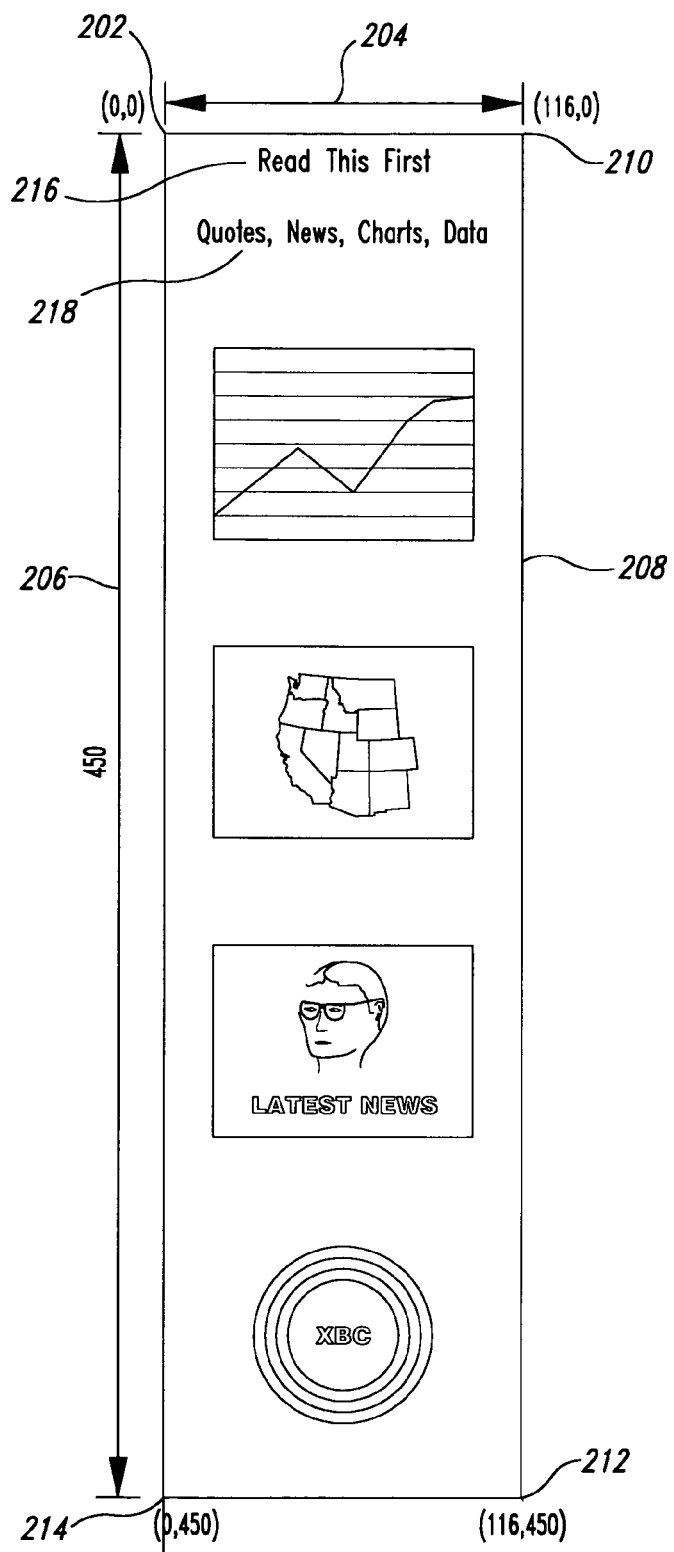
FIG. 2 is an expanded view of an image component of the web page displayed in FIG. 1.

FIG. 2 is an expanded view of the smaller complex image component of the web page displayed in FIG. 1. The image can be described in terms of device coordinates correlated to the pixel density of the client computer display monitor on which the web page shown in FIG. 1 is displayed. The origin of the device coordinate system, with coordinates (0,0), occurs at the upper left hand corner of the displayed web page 202. An x axis 204 emanates horizontally from the origin, and a y axis 206 emanates downward from the origin. The width of the image 204 shown in FIG. 2 is 116 unites, where units roughly correspond to pixels, and the height of the image is 450 units. Thus, in terms of the device coordinate system, the four corners 202, 210, 212, and 214 of the image shown in FIG. 2 have coordinates (0,0), (116,0), (116,450), and (0,450), respectively.

The image shown in FIG. 2 is meant to contain two active regions, the first active region corresponding to the text "Read This First" 216 and the second active region corresponding to the text "Quotes, New, Charts, Data" 218. Commonly, when a user moves a cursor into an active region via mouse operations, the form of the cursor changes to indicate that the cursor is positioned over an active region. For example, the cursor may change from an arrow to a small icon of a pointing finger. Conversely, if the cursor is moved from an active region to an area of the web page not within an active region, the cursor reverts from the pointed finger icon back to an arrow. More importantly, when a user inputs a mouse click to the user's computer while the cursor is positioned over an active region, an action associated with the active region is carried out by the user's browser. For example, in the present case, referring back to FIG. 1, when the user positions the cursor over the text line "Read This First" and clicks the user's mouse, the browser may display a new web page containing a text-based disclaimer. When the user positions a cursor over the text line "Quotes, News, Charts, Data" 108 and clicks the user's mouse, the browser may display a new web page containing a combination of texts and graphics that represent a menu through which the user may navigate to additional web pages containing quotes, news, charts, and data. There are alternative mechanisms available to web page designers for including text-based hyperlinks within web pages. In the present case, the text lines (106 and 108 in FIG. 1) are included within an image in order to render the text lines in a font or display format not available to the web page designer when using the alternative mechanisms. In general, active regions are most commonly employed for activating regions of images that contain graphical objects or subimages.

Example HTML code that describes the image shown in FIG. 2 is provided below:

```
1 <img src="art/quotesreadthis.jpg" width=116 height=450
   USEMAP="#quotes">
2 <MAP name="quotes">
3 <AREA shape="rect" alt="Read This First" coords="10,
   2,104,15" HREF="
4 /help/disclaimer.htm">
5 <AREA shape="rect" alt="Quotes, News, Charts, Data"
   coords="8,23,107,42"
6 HREF="http://quote.fool.com">
7 </MAP>
```

Line 1 contains an image tag, introduced by the symbol "<img" and followed by a number of attributes: (1) "src," an attribute that describes the image source containing the image, in this case "art/quotesreadthis.jpg"; (2) "width," an attribute that specifies, in device coordinates, the width of the image; (3) "height," an attribute that specifies the height of the image in device coordinates; and (4) "USEMAP," an attribute specifying a client-side image map that defines active regions associated with the image. The client-side image map is specified on lines 2–7, above. The client-side image map specification begins with the symbol "<MAP" on line 2 and ends with the symbol "/MAP>" on line 7. The attribute "name," defined on line 2, specifies the name of the client-side image map, in this case "quotes." Each active region of the map is specified by AREA tags that include the attributes: (1) "shape," an attribute specifying the shape of the region, where these shapes may include rectangle, polygon, circle, and point; (2) "coords," an attribute that specifies the coordinates that define the points of the active region; and (3) "HREF," an attribute that specifies an image source containing an HTML web page description, an image, or a reference to a software routine. For example, the active region associated with the text line "Read This First" 216 in FIG. 2 is described by the AREA tag on lines 3 and 4, above, and the active region associated with the text "Quotes, News, Charts, Data" 218 in FIG. 2 is defined by the AREA tag on lines 5 and 6, above.

Figure 3:
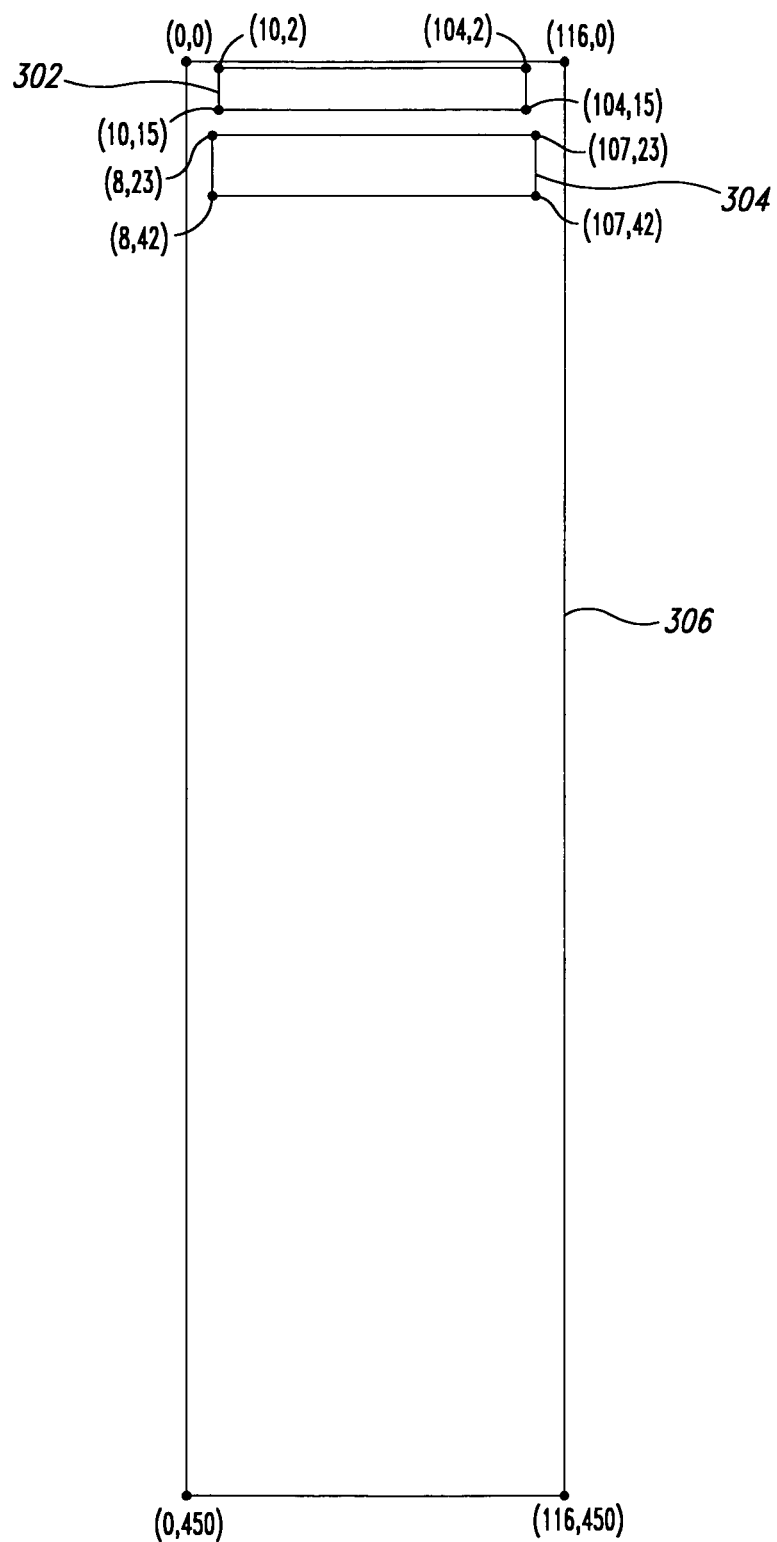
FIG. 3 shows a graphical description of a client-side area-map associated with the image shown in FIG. 2.

FIG. 3 shows a logical graphical description of the client-side image map associated with the image shown in FIG. 2. The client-side image map shown in FIG. 3 is defined by the above HTML code extract. The first active region 302, corresponding to lines 3 and 4 of the HTML code extract, above, and the second active region 304, corresponding to lines 5 and 6 in the above HTML code extract, are both shown within a rectangle 306 corresponding to the image defined on line 1 of the above HTML code extract. On line 2, the x,y coordinates of the upper left hand corner of the active region, (10,2), and the x,y coordinates of the right hand lower corner of the active region (104,15) are specified as the value of the attribute "coords." Similarly, the x,y coordinates for the upper left hand and lower right hand corners of the second active region, (8,23) and (107,42), are specified above on line 5. When a cursor is placed over the first active region and a mouse click input, the contents of the HTML file "/help/disclaimer.htm" are to be rendered and displayed by the browser, and when a cursor is placed over the second active region and a mouse click input, the contents of the HTML file "http://quote.fool.com" are to be rendered and displayed by the browser, as specified on lines 4 and 5.

Certain enhanced web browsers allow users to dynamically alter the display of images within a web page. When displayed by such enhanced web browsers, the image within the web page is referred to as a "dynamic image." Dynamic alterations invoked by user input include changing the scale, or resolution, of the display in order to zoom into a subregion of the display or zoom out to display the dynamic image at smaller scale, and include scrolling, or panning, operations that allow the user to translate the dynamic image horizontally and vertically. Enhanced image viewers associated with enhanced browsers track user input in order to dynamically alter the scale, or resolution, and position of dynmaic images included within a web page. One system that implements dynamic images within web pages is the Hewlett Packard OpenPix™ system. A more detailed description of the networking protocol and theory underlying the OpenPix™ system is included in a web page provided by the Digital Imaging Group with the following uniform resource locator: "http://itd.hpl.hp.com/itd_home/DIS99." Using this system, a web author may add an OpenPix attribute to an image tag to flag the image as an OpenPix image. The HTML code extract, provided below, includes the OpenPix attribute "OPXVtype," on line 2 to flag the image defined by the remaining portions of the HTML code extract as being an OpenPix image:

```
1 <img src="art/quotesreadthis.jpg" width=116 height=450
   USEMAP="#quotes"
2 OPXVtype="AUTO">
3 <MAP name="quotes">
4 <AREA shape="rect" alt="Read This First" coords="10,
   2,104,15" HREF="
5 /help/disclaimer.htm">
6 <AREA shape="rect" alt="Quotes, News, Charts, Data"
   coords="8,23,107,42"
7 HREF="http://quote.fool.com">
8 </MAP>
```

Figure 4:
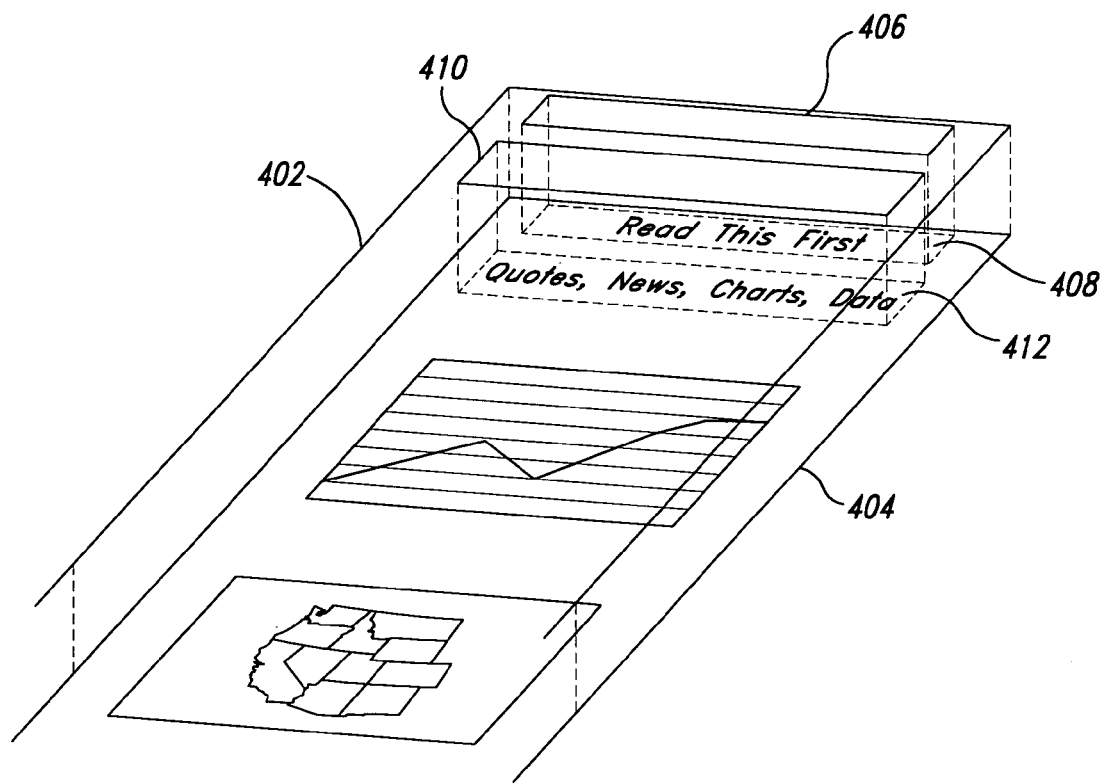
FIG. 4 illustrates the logical superposition of a client-side image map onto a displayed OpenPix image.

FIG. 4 illustrates the logical superposition of a client-side image map onto a displayed OpenPix image. In FIG. 4, a graphical representation of the client-side image map 402 is shown overlying the displayed image 404 defined by the above HTML code extract. The first active region 406, defined above on lines 4 and 5, overlies the text "Read This First" 408. The second active region 410, defined above on lines 6 and 7, overlies the text "Quotes, News, Charts, Data" 412. The graphical representation of the client-side image map 402 is not displayed to the user, but is instead an abstract definition of the shapes, sizes, and positions of active regions associated with the image 404.

Figure 5:
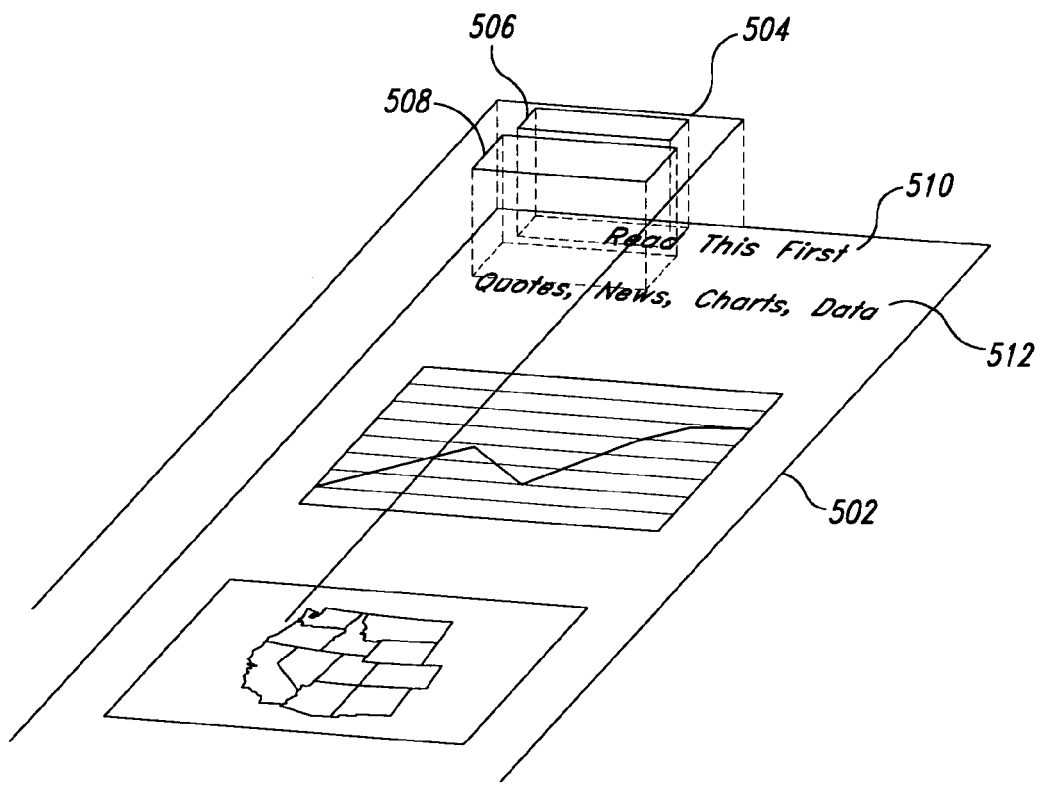
FIG. 5 illustrates the client-side image map and OpenPix image shown in FIG. 4 following a zoom operation that expands the scale at which the OpenPix image is displayed.

FIG. 5 illustrates the client-side image map and OpenPix image shown in FIG. 4 following a zoom operation that expands the scale at which the image is displayed. In FIG. 5, the image 502 has been expanded to approximately twice its original display size. However, note that the client-side image map 504 has not automatically been expanded. Current browsers and image viewers that display OpenPix images embedded within web pages do not automatically alter client-side image maps associated with OpenPix images embedded within web pages. Although, in upcoming Dynamic HTML, it will be possible for web page designers to insert additional logic within HTML descriptions, or to invoke software routines from HTML descriptions for web pages in order to track display altering operations on the displayed OpenPix images and accordingly alter any client-side image maps associated with those images, it may be quite difficult for web page designers to implement such tracking and client-side image map updating, and, in currently-available standard HTML, inclusion of additional logic within HTML descriptions is not possible. One problem, as discussed above, is that client-side image maps describe active regions in terms of device coordinates, as shown above in FIG. 2. However, once the scale of an OpenPix image has been altered, the device coordinates of the area of the image change, and it is a non-trivial task for the web page designer to attempt to relate the changed device-coordinates back to the areas within client-side image maps. As a result, as shown in FIG. 5, the active regions 506 and 508, originally intended to encompass the text lines 510 and 512, no longer completely overly those text lines. After a series of zoom or pan operations, the active regions as defined in device-coordinates in the client-side image map 504 may bear little or no correspondence to those portions of the image with which a web page designer intended them to be associated.

The present invention provides a solution to the problem illustrated in FIGS. 4 and 5, as well as a method and system for passing client-side image maps to enhanced image viewers invoked by enhanced browsers. The present inventions provides dynamic-adaptive client-side image maps ("DACSIMs") that are automatically adjusted during image alteration operations conducted through a web browser so that the active regions defined within the DACSIMs maintain their intended correspondence with regions within images associated with the DACSIMs.

Figure 6:
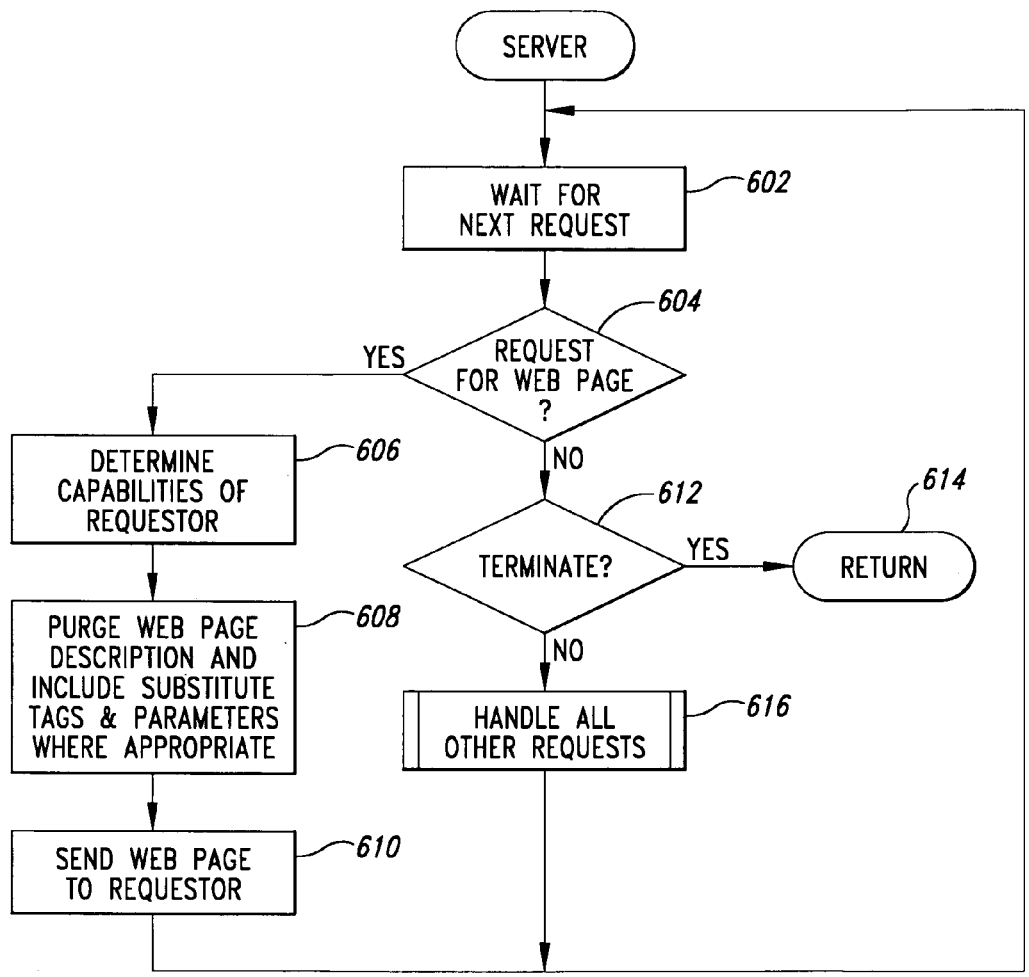
FIG. 6 is a high-level flow control diagram of a request handling routine on a server computer that incorporates the functionalities of an adaptive delivery module.

One component of the described embodiment of the present invention that implements DACSIMs is an adaptive delivery module ("ADM") that runs on a server computer. FIG. 6 is a high-level flow control diagram of a request handling routine on a server computer that incorporates the functionalities of the adaptive delivery module. In step 602, the routine "server" waits for reception of a next request, via the Internet, from a client computer. When a next request is received, the routine "server" determines, in step 604, whether the request represents a request from a client computer for the HTML description of a web page. If so, then the routine "server" carries out steps 606, 608 and 610 that together compose the functionalities of the ADM, following which control returns to step 602 where the routine "server" waits for a next request from a client computer. In step 606, the routine "server" determines, either from information included by the client computer in the request, or by an additional exchange of information between the server computer and the client computer via the Internet, the capabilities and configuration of the client computer. In particular, the routine "server," in step 606, determines the type and version of the web browser running on a client computer as well as the type of enhanced viewer that the web browser may use to display any OpenPix images described within the HTML description of the requested web page. In step 608, the routine "server" retrieves the HTML description of the request web page, parses the HTML description to identify image and client-side image map definitions, and when appropriate, in accordance with the capabilities of the requesting web browser and the configuration of the server, replaces the HTML image and client-side image map definitions with the HTML equivalent of an enhanced viewer invocation, including various parameters to be passed to an instantiated enhanced viewer to describe the image and the client-side image map originally defined within the HTML description. Finally, in step 610, the routine "server" sends the transformed HTML web page description, including invocations of the enhanced image viewer, to the requesting client computer. If the request received by the routine "server" in step 602 is not a request for a web page, then, in step 612, the routine "server" determines whether the request is a request to terminate. If so, then the routine "server" returns in step 614. Otherwise, the routine "server" calls, in step 616, the routine "handle all other requests" to handle the request, and then returns to step 602 to wait for the next client request. The other types of requests that may be received by the routine "server," and the details of the routine "handle all other requests," are not pertinent to a discussion of the present invention and will not be discussed further.

The HTML extract, provided below, represents the HTML code substituted by the ADM for the HTML descriptions of the image shown in FIGS. 2, 4 and 5, provided above, in the case that the server is configured to deliver an ActiveX™ viewer to the browser of the requesting client computer and the browser of the requesting client computer is capable of using the ActiveX viewer to display an OpenPix image:

```
1  <object ID="Fviewer" WIDTH="116" HEIGHT="450"
2       CLASSID="CLSID:56ECEF01-E59E-11DO-9243-
   000000000000"
3                      CODEBASE="/OpenPix/controls/
   ViewPix01.CAB#Version=0,2,3,6">
4  <param name="SourceURL"
5  value="/opx-bix/OpxIIPISA.d11?FIF=/art/quotesreadthis.
   jpg">
6  <param name="MouseDefaults" value="N">
7  <PARAM NAME="OPX_CLIMAP_AREAS"
8  VALUE="OPX_VIEWER2^^myMap^^
9   Area_01^^rectangle^^10,2,104,15^^/help/disclaimer.htm.
   htm ^^^]]^^
10      Area_02^^rectangle^^8,23,107,42^^http://quote.fool.
   com^^^]]^^#>
11 </object>
```

In the above HTML enhanced viewer, the enhanced viewer invocation is introduced by the symbol "<object" on line 1 and terminated by the symbol "/object>" on line 11. This object tag includes, on line 1, attributes that identify the enhanced viewer that will display the image as well as the width and height of the displayed image in device coordinates. The enhanced viewer invocation includes a parameter "SourceURL" on line 4 with a value, specified on line 5, that includes the name of the image source that contains the image to be displayed, in this case "/arts/quotesreadthis.jpg." The parameter "OPX_CLIMAP_AREAS," defined on line 7, is a description of a DACSIM, namely a DACSIM corresponding to the client-side image map shown above in FIG. 3 and described in the above HTML extracts. The value of the parameter "OPX_CLIMAP_AREAS" is found on lines 8–10, above.

The format for the value of an "OPX_CLIMAP_AREA" parameter that defines a DACSIM is provided below:
1 ImgName
2 MapName
3 Area01
4 SHAPE
5 COORDS
6 HREF
7 ONMOUSEOVER
8 ONMOUSEOUT
9 Area02
10 SHAPE
11 COORDS
12 HREF
13 ONMOUSEOVER
14 ONMOUSEOUT The first component of the "OPX_CLIMAP_AREAS" parameter value, or field, on line 1 above, is the name of the image. The second field, on line 2 above, is the name of the DACSIM defined by the "OPX_CLIMAP_AREAS" parameter. Next follow descriptions of the active regions defined within the DACSIM. Two active regions are shown in the format, above, on lines 3–8 and lines 9–14. An arbitrary number of areas may be included within the value of an "OPX_CLIMAP_AREAS" parameter. Each active region is introduced by the symbol "Area" appended to a number corresponding to the order of the definition of the active region within the "OPX_CLIMAP_AREAS" value. For example, the first active region is introduced in the above format on line 3 with the symbol "Area01." Each area may be further defined by five attributes: (1) a shape attribute that specifies the shape of the active region, where a shape may be a circle, a polygon, or a rectangle; (2) a coordinates attribute that specifies the coordinates of points that define the active region, where the defining points for a circle are the center and an edge point, the defining points for a polygon are the vertices, and the defining points for a rectangle are the upper left hand corner and lower right hand corner; (3) an HREF attribute that specifies a web page, image, or software routine to be displayed or invoked upon input of a mouse click while a cursor is positioned over the active region; (4) a "onmouseover" attribute that specifies a web page, image, or software routine to be displayed or invoked when a cursor is moved into the active region; and (5) a "onmouseout" attribute that specifies a web page, image, or software routine to be displayed or invoked when a cursor is moved from within the active region to a point outside of the active region.

In the HTML enhanced viewer invocation code, above, the DACSIM specification on lines 7–10, according to the format shown above, is translated into a character string with the character string format shown below:
ImgName^^MapName^^Area_01^^SHAPE^^LUX,LUY,
    RLX,RLY^^HREF^^--^^]]^^

The various fields as specified by the format, are separated in the character string format by the symbol "^^." Missing or omitted fields are indicated by the symbol "--." Note that, in general, each field must either have a string value or must be represented by the symbol """-"" since the identity of a field derives only from the field's position within the character string. However, the special symbol "]]^^" terminates the character string representation of the DACSIM's HTML specification, including implicitly inserting empty field designators for any remaining unspecified fields within the active region in which this special terminating symbol appears.

When the browser of the client computer receives a transformed HTML page from the server computer, the browser invokes an enhanced viewer, such as an ActiveX viewer, for each OpenPix image included in the transformed HTML description. The browser parses the HTML viewer invocation in order to extract the various parameters included within the invocation and passes those parameters to the enhanced viewer during instantiation of the viewer. The browser then displays the web page described by the received transformed HTML description and the instantiated enhanced viewers display the OpenPix images included within the HTML description.

Figure 7:
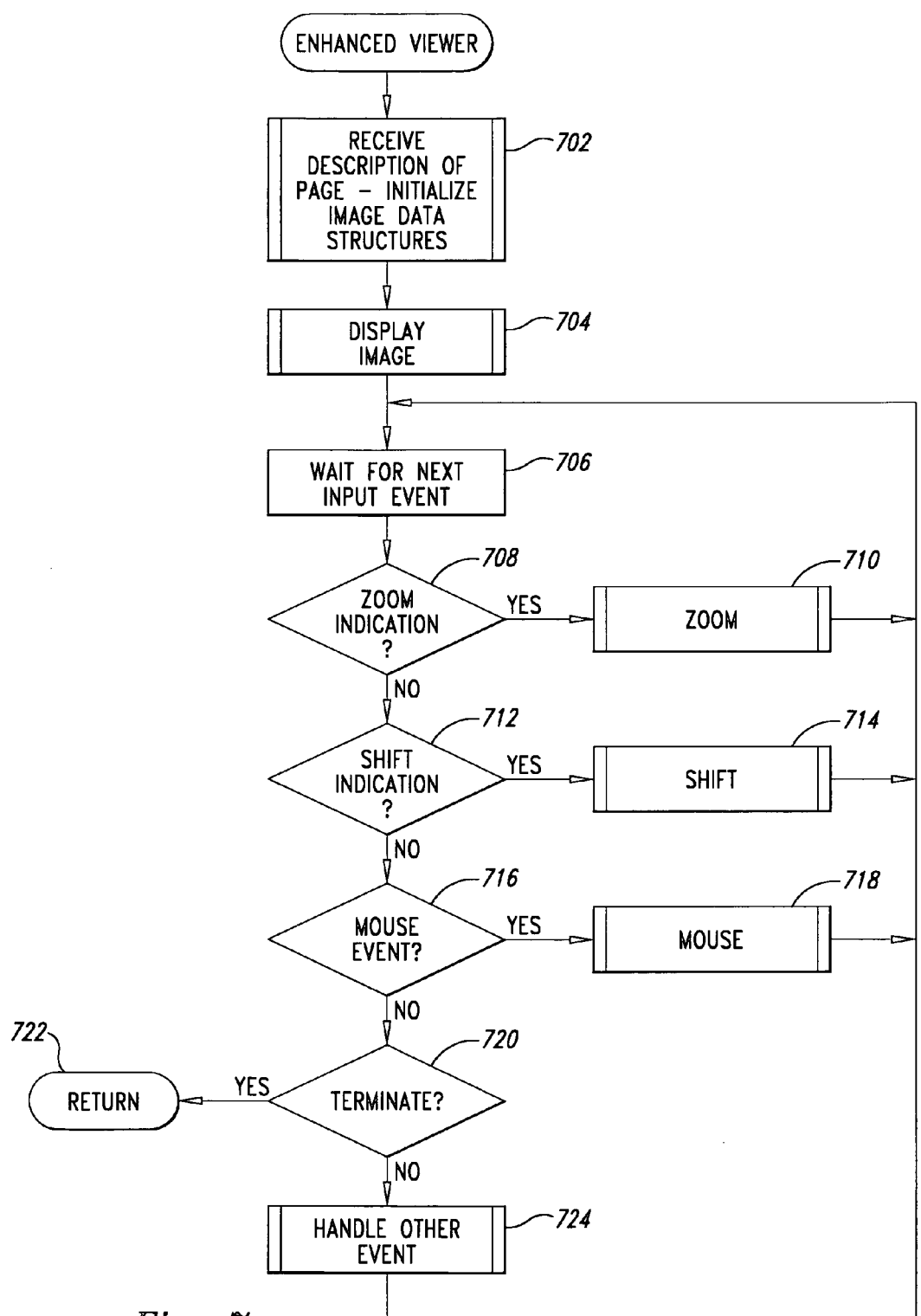
FIG. 7 is a flow control diagram of the operation of an enhanced viewer as instantiated by a browser for displaying an OpenPix image with an associated dynamic-adaptive client-side image-map.

FIG. 7 is a flow control diagram of the operation of an enhanced viewer as instantiated by a browser for displaying OpenPix images with an associated DACSIM. In step 702, the enhanced viewer is instantiated and, as part of the instantiation process, receives a list of parameters that specify the image to be displayed, the initial width, height, and location of the image on the display device of the client computer on which the enhanced viewer is running, and parameters that define a DACSIM associated with the image. The enhanced viewer instantiates data structures to contain information stored in the received parameters. In step 704, the enhanced viewer retrieves portions of an image source containing the image to be displayed, called tiles, either from the client computer or via an Internet exchange with a server computer, and displays the portions of the image represented by the tiles on the display monitor of the client computer according to the parameters that specify the initial size and position of the portion of the image displayed. The remaining steps compose a continuous loop in which the enhanced view receives input events form the browser and, when appropriate, carries out various operations in response to those input events. In step 706, the enhanced viewer waits for the next input event to be passed to the enhanced viewer from the browser. These input events include mouse movement events and mouse click operations. When an event is received, the enhanced viewer determines, in step 708, whether the event indicates that the scale, or resolution, of the image should be changed in accordance with a zoom indication invoked by the user. If so, then the enhanced viewer calls the routine "zoom" in step 710 to accordingly re-scale the displayed image and then returns to step 706 to wait for a subsequent input event. If, on the other hand, the event received in step 706 is an indication to pan the image, as detected in step 712, the enhanced viewer calls the routine "shift" in step 714 to pan the image and then returns to step 706 to await further input. If the event received in step 706 is a mouse operation, as detected in step 716, the enhanced viewer then calls the routine "mouse" in step 718 to perform any actions associated with active regions underlying the displayed cursor, and then returns to step 706 to wait for further input. If the input event received in step 706 is an indication to terminate execution of the enhanced viewer, as detected by the enhanced viewer in step 720, then the enhanced viewer returns to step 722. Finally, any other type of event received in step 706 is handled by the enhanced viewer by calling the routine "handle other event," in step 724, following which the enhanced viewer returns to step 706 to wait for further input. Other types of events handled by the routine "handle other event" are not pertinent to the present invention, and neither these events nor the routine "handle other event" will be described further. The data structures instantiated in step 702, and the routines "zoom," "shift," and "mouse," called in step 710, 714, and 718, respectively, will be described below in a C++-like pseudocode implementation.

Figure 8:
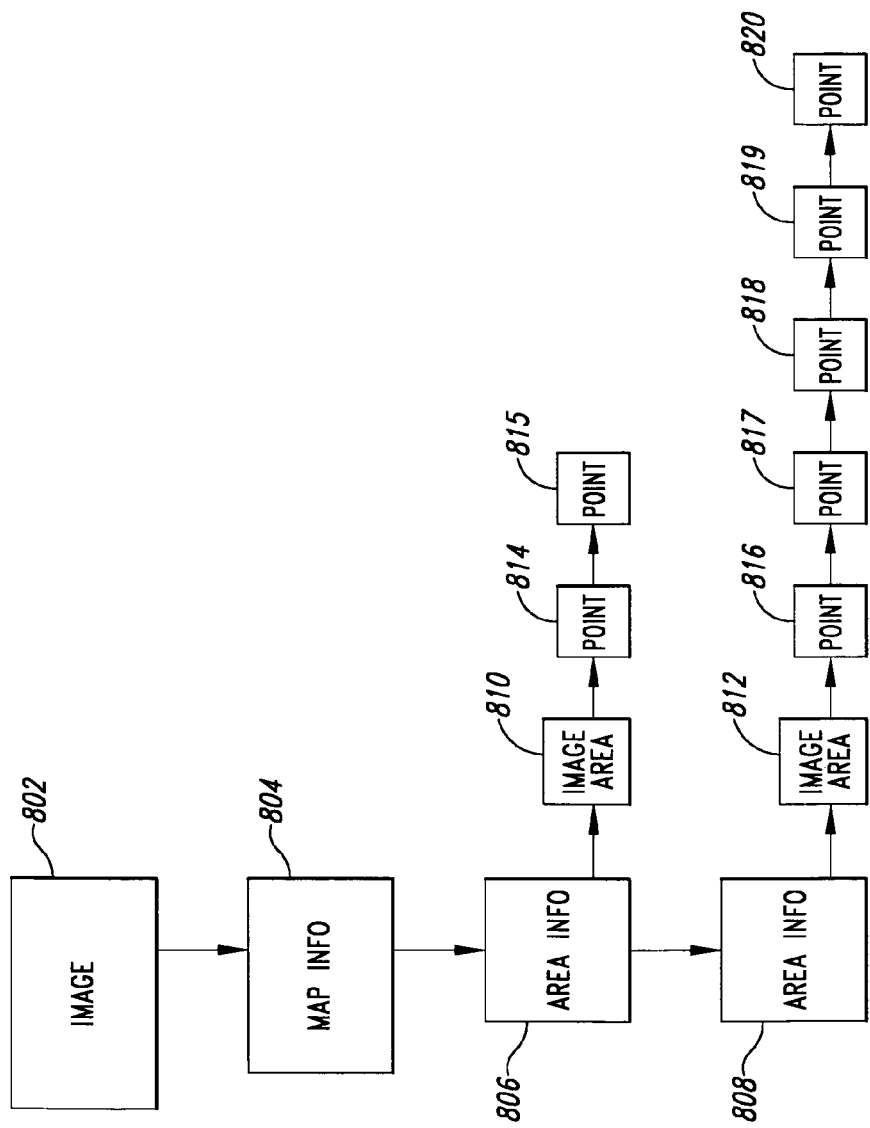
FIG. 8 is a block diagram representation of the data structure instantiated by an enhanced viewer in order describe active regions within an image displayed by the enhanced viewer.

FIG. 8 is a block diagram representation of the data structures instantiated by an enhanced viewer to contain display information for an image and descriptions of active regions associated with the image. A C++-like pseudocode implementation, to be provided below, is object oriented, and consequently the data structures shown in FIG. 8 are objects that include stored data that are associated with functions that operate on that stored data. The topmost object is an Image object 802 that contains a reference to the image being displayed, such as a URL, reference to a set of objects that describe an associated DACSIM, and current device coordinates of the displayed image. An instantiated Image object is essentially an enhanced viewer in the C++-like pseudo code implementation that follows. The highest level DACSIM object 804 is a MapInfo object that includes a reference to the name of the map represented by the MapInfo object, a reference to the name of the image with which the map is associated, and a reference to a list of AreaInfo objects 806 and 808 that describe active regions associated with the image displayed by the enhanced viewer. The AreaInfo objects 806 and 808 each includes a reference to the name of the area, references to web page descriptions, images, or software routines to displayed or invoked upon user input to the active region of the displayed image described by the AreaInfo object, and references to ImageArea objects 810 and 812 that describe the shape and position of the active region described by the referencing AreaInfo object 806 and 808, respectively. Each ImageArea object contains indication of the type of area, the number of defining points for the area, and a reference to a list of coordinates of those defining points. Coordinates for each point are stored in a separate Point objects 814–820. When the browser detects user input indications for image alteration operations, such as zooming and panning, or mouse input events, an event handler within the browser will pass those events, in turn, to an instantiated enhanced viewer displaying OpenPix images within the web page displayed by the browser, as discussed with reference to FIG. 7, above. The enhanced viewer uses the information stored in the objects shown in FIG. 8 to carry out any actions invoked by the user input events.

The following C++-like pseudocode implementation provides a relatively straightforward example of how the DACSIM and the enhanced viewer and browser components related to the present invention can be implemented to adjust active regions defined by the DACSIM to changes in a displayed image due to zoom and pan operations. Straightforward member functions of the classes, declared below, are not implemented. Instead, implementations are provided only as necessary to describe the present invention.

First, an enumeration defining the various active region shapes and a class that defines a Point object that stores, in image coordinates, a defining point of an active region are provided below:

```
enum areaType={DEFAULT, CIRCLE, POLY, RECT};
```

```
1  class Point
2  {
3      protected:
4          double x;
5          double y;
6          Point* next;
7
8      public:
9          double  getX( ) const;
10         void    setX (const double x);
11         double  getY( ) const;
12         void    setY (const double y);
13         Point*  getNext( ) const;
14         void    setNext (const Point* nxt);
15         Point (const double x, const double y, const Point* nxt);
16         Point (const double x, const double y);
17         ~Point( );
18 };
```

Instantiated Point objects appear as objects 814–820 in FIG. 8. The x,y image coordinates are stored as floating point values in data members "x" and "y" declared above on lines 4 and 5. Images coordinates range from 0 to 1. They are fractions of the width and height of an image, and are thus valid regardless of how the image is scaled or translated in device coordinates. These fraction coordinates are one embodiment of device-independent, image-relative coordinates, referred to as image coordinates. The Point object also includes a data member "next," declared above on line 6, that allows instantiated Point objects to be linked together in a linked list. The member functions declared above on lines 9–17 are standard member functions for setting and retrieving data member values, as well as several constructors, declared above on lines 15–16, and a destructor, declared above on line 17. Constructors initialize objects, including data members, when objects are instantiated, and destructors perform cleanup functions as objects are being destroyed. Many of the remaining classes of the pseudocode implementation contain similar standard member functions. These functions are straightforwardly implemented, and will therefore not be implemented or further discussed below.

The next class is the class "ImageArea," declared below:

```
1  class ImageArea
2  {
3      protected:
4          areaType    tp;
5          int         numPoints;
6          Point*      points;
7          int         getNumPoints( ) const;
8          void        setNumPoints (const int);
9          Point*      getPoints( ) const;
10         void        setPoints (const Point* p);
11         void        setType (const areaType);
12
13     public:
14         virtual bool  isInside (const double x, const double y) = 0;
15         areaType      getType( );
16         ImageArea( );
17         virtual ~ ImageArea( );
18 };
```

An instantiated ImageArea object (810 and 812 in FIG. 8) contains a representation of the shape of an active region, data member "tp" declared above on line 4, a representation of the number of points by which the size and location of the active region is defined, data member "numPoints" declared above on line 5, and a reference to a linked list of Point objects that define the size and location of the active region, data member "points" declared above on line 6. The class "ImageArea" is an abstract class from which specific classes for each possible shape are derived. The virtual member function "isInside," declared above on line 14, takes image coordinate arguments "x" and "y" and returns a boolean value to indicate whether the point defined by the image coordinate arguments resides within the active region defined by the contents of an instantiated ImageArea object.

Declaration of classes "Rectangle" and "Polygon" derived from the class "ImageArea" are provided below:

```
1 class Rectangle : public ImageArea
2 {
3    public:
4        bool            isInside (const double x, const double y);
5        Rectangle (double lx, double ly, double rx, double ry);
6        Rectangle (Point* corners);
7 };
1 class Polygon: public ImageArea
2 {
3    public:
4        bool isInside (const double x, const double y);
5        Polygon (Point* vertices);
6 };
```

An implementation of the member function "isInside" for the class "Rectangle" is provided below:

```
1 bool Rectangle::isInside (const double x, const double y)
2 {
3        Point *leftUpper *rightLower;
4
5        rightLower = getPoints( );
6        leftUpper = rightLower->getNext( );
7        if (x ≦ rightLower->getX( ) && x ≧ leftUpper->getX( ) &&
8           y ≦ rightLower->getY( ) && y ≧ leftUpper->getY( )) return TRUE;
9        else return FALSE;
10 }
```

On lines 5 and 6, member function "isInside" sets the local pointer variables "rightLower" and "leftUpper" to point to the Point objects defining the position of the right, lower corner of the rectangular active region and the position of the left, upper corner of the rectangular active region, respectively. On lines 7–8, the member function "isInside" compares the x and y coordinates of the two defining points of the rectangular active region with the coordinates of a point, provided as arguments "x" and "y," on line 1, above, to determine whether or not the point is within the rectangular active region.

An implementation of a constructor for the class "Rectangle" is provided below:

```
1 Rectangle:: Rectangle (double lx, double ly, double rx, double ry)
2 {
3    Point *p = new Point (lx,ly);
4    setPoints (new Point (rx, ry. p));
5    setType (RECT);
6    setNumPoints (2);
7 }
```

The constructor instantiates Point objects to contain the coordinates for the two defining points of the rectangular active region and links them into a linked list, on lines 3–4. The constructor then set the type of the derived ImageArea to "RECT" and sets the number of defining points to the value "2."

The class "AreaInfo" (806 and 808 in FIG. 8) is declared below:

```
1 class AreaInfo
2 {
3    protected:
4        AreaInfo*       nextArea;
5        ImageArea*      theImageArea;
6        UString*        areaName
7        UString*        hrefStr;
8        UString*        onmouseoverStr;
9        UString*        onmouseoutStr;
10
11   public:
12       void            appendAreaList (const AreaInfo*);
13       AreaInfo*       getNextArea( ) const;
14       void            setNextArea (const AreaInfo*);
15       ImageArea*      getImageArea( ) const;
16       void            setImageArea (const ImageArea*);
17       UString*        getAreaName( ) const;
18       void            setAreaName (const UString*);
19       UString*        getHrefStr( ) const;
20       void            setHrefStr (const UString*);
21       UString*        getOnmouseoverStr( ) const;
```

-continued

```
22       void            setOnmouseoverStr (const UString*);
23       UString*        getOnmouseoutStr( ) const;
24       void            setOnmouseoutStr (const UString*);
25       AreaInfo( );
26       ~ AreaInfo( );
27 };
```

This class represents an active region. An AreaInfo object includes a reference to an ImageArea object, "theImageArea" declared above on line 5, that defines the shape, size, and location of the active region represented by the AreaInfo object. An AreaInfo object also contain a reference to another AreaInfo object, "nextArea" defined above on line 4, and a reference to a character string representation of the name of the active area represented by the AreaInfo object, "areaName" declared above on line 6. An AreaInfo object also contains data members that reference web pages, images, or software routines that are to be invoked upon mouse-click, mouse-move-into, and move-move-from inputs, "hrefStr," "onmouseoverStr," and "onmouseoutStr," respectively, declared above on lines 7–9.

The class "MapInfo" (804 in FIG. 8) is declared below:

```
1 class MapInfo
2 {
3    protected:
4        UString*    imgName;
5        UString*    mapName;
6        AreaInfo*   areaList;
7
8    public:
9        UString*    getImgName( ) const;
10       void        setImgName (const UString*);
11       UString*    getMapName( ) const;
12       void        setMapName (const UString*);
13       AreaInfo*   getAreaList( ) const;
14       void        setAreaList (const AreaInfo*);
15       MapInfo( );
16       virtual ~MapInfo( );
17 };
```

A MapInfo object is the highest-level object that, together with objects referenced by the MapInfo object and an Image object that references the MapInfo object, comprises at run-time an instantiated DACSIM. A MapInfo object includes data members that reference the name of the associated image, "imgName" declared above on line 4, reference the name of the DACSIM, "mapName" declared above on line 5, and a reference to a list of AreaInfo objects, "areaList" declared above on line 6, that define the active areas within the image having the name referenced by the data member "imgName."

A declaration for the class "Image" (802 in FIG. 8) is provided below:

```
1 class Image
2 {
3    private:
4        double leftX;
5        double leftY
6        double rightX;
7        double rightY;
8        UString*    img;
9        MapInfo*    map;
10
11   public:
12       void        zoom (const int x, const int y, const double mx,
13                       const double my);
14       void        shift (const int dx, const int dy);
15       bool        isInside (const int x, const int y);
16       void        display( );
17       void        mouseClick (int x, int y);
18       void        mouseMove (int fromX, int fromY, int toX, int toY);
19       UString*    getImage( ) const;
20       void        setImage (const UString*);
21       MapInfo*    getMap( ) const;
22       void        setMap (const MapInfo* m);
23       Image (const int lx, const int ly, const int rx, const int ry,
24           const UString* name);
25 };
```

An Image object contains data members that represent the device coordinates of the upper left corner and lower left corner of the displayed images, "leftX," "leftY," "rightX," and "rightY" declared above on lines 4–7. In the current implementation, displayed images are assumed to be rectangular. These values are represented as floating point values to allow for precise multiplication by scale factors for zooming operations. An Image object also contains a reference to the image, "img" declared above on line 8, and a reference to a MapInfo object, "map" declared above on line 9, that represents a DACSIM associated with the image. An instantiated Image object, in the current implementation, is an instantiated enhanced viewer. It provides the following interface member functions: (1) "zoom," a member function that directs the Image object to scale the displayed image from a point described by supplied device coordinates "x" and "y" using the horizontal and vertical scale factors "mx" and "my"; (2) "shift," a member function that directs the Image object to pan the displayed object by horizontal and vertical device units "dx" and "dy"; (3) "isInside," a member function that directs the Image object to report whether a point, supplied in device coordinates "x" and "y," is within the displayed image (note that this member function is distinct from the identically named member function of the ImageArea class); (4) "display," a member function that directs the Image object to display the image referenced by the data member "img"; (5) "mouseClick," a member function that, when an active region overlies the point at which the mouse has been clicked by a user, supplied as device coordinates "x" and "y," directs the Image object to carry out any actions associated with the active region; and (6) "mouseMove," a member function that directs the Image object to carry out any actions associated with an active region into which, or out from which, the mouse has moved, with the starting and end points of the mouse movement supplied as device coordinates "fromX," "fromY," "toX," and "toY."

An implementation for the Image function "zoom" is provided below:

```
1 void Image::zoom (const double mx, const double my)
2 {
3    int zoomx, zoomy;
4
5    zoomx = ((mx * (rightX – leftX)) – (rightX – leftX)) / 2;
6    zoomy = ((my * (rightY – leftY)) – (rightY – leftY)) / 2;
7    leftX -= zoomx;
8    rightX += zoomx;
9    leftY -= zoomy;
10   rightY += zoomy;
11   display( ):
12 }
```

The Image member function "zoom" sets the local variables "zoomx" and "zoomy" to displacements of the defining points of the image along the x and y axes, respectively, on lines 5 and 6, above, and adjusts the locations of the defining points of the image by the displacements, on lines 7–10, above. Finally, on line 11, above, zoom redisplays the image at a new position corresponding to the changed defining points.

An implementations for the Image function "shift" is provided below:

```
1 void Image::shift (const int dx, const int dy)
2 {
3    leftX += dx;
4    rightX += dx;
5    leftY += dy;
6    rightY += dy;
7    display( );
8 }
```

The Image member function "shift" simply shifts the defining points of the image according to device unit delta arguments "dx" and "dy," on lines 3–6, above, and redisplays the the image at a new position corresponding to the changed defining points on line 7, above.

An implementation for the Image function "mouseClick" is provided below:

```
1  void Image::mouseClick (int x, int y)
2  {
3      AreaInfo* a;
4      double imageX, imageY;
```

ImageArea member function "isInside" through an AreaInfo pointer stored in loop variable "a," on line 13, and, if so, invokes the mouse click action associated with the active region on line 15. In the current implementation, it is assumed that active regions do not overlap, and hence, after an active region to which the mouse click was directed is found and the appropriate action invoked, on line 15, the while loop is terminated by a break statement on line 16.

An implementation for the Image function "mouseMove" is provided below:

```
1  void Image::mouseMove (int fromX, int fromY, int toX, int toY)
2  {
3      AreaInfo* a
4      double imageFromX, imageFromY, imageToX, imageToY;
5
6      if (isInside (fromX, fromY) || isInside (toX, toY))
7      {
8          imageFromX = fromX - leftX / rightX - leftX;
9          imageFromY = fromY - leftY / rightY - leftY;
10         imageToX = toX - leftX / rightX - leftX;
11         imageToY = toY - leftY / rightY - leftY;
12
13         a = images->getMap( )->getAreaList( );
14         while (a != NULL)
15         {
16             if (a->getImageArea( )->isInside (imageFromX, imageFromY) &&
17                 !a->getImageArea( )->isInside (imageToX, imageToY))
18                 invoke (a->getOnmouseoutStr( ));
19             else if (!a->getImageArea( )->isInside (imageFromX, imageFromY) &&
20                 a->getImageArea( )->isInside (imageToX, imageToY))
21                 invoke (a->getOnmouseoverStr( ));
22             else a = a->getNextArea( );
23         }
24     }
25 }
```

-continued

```
5
6   if (isInside (x, y))
7   {
8       a = getMap( )->getAreaList( );
9       imageX = x - leftX / rightX - leftX;
10      imageY = y - leftY / rightY - leftY,
11      while (a != NULL)
12      {
13          if (a->getImageArea( )->isInside (imageX, imageY))
14          {
15              invoke (a->getHrefStr( ));
16              break;
17          }
18          else a = a->getNextArea( );
19      }
20  }
21 }
```

The Image function "mouseClick" takes the device coordinate position of a mouse click input event, "x" and "y," as arguments and invokes an appropriate action if the mouse click was input to any active region within the image. First, on line 6, mouseClick determines whether the mouse click was input within the image. If so, then mouseClick sets the values of the local variables "imageX" and "imageY" to the image-relative coordinates of the mouse click, on lines 9 and 10, above. Then, in the while loop of lines 11–19, mouseClick determines whether the mouse click event was directed to any of the active regions via a call to the The Image function "mouseMove" determines, on line 6, if the mouse was moved from inside the area of the displayed image to outside the area of the displayed image or vice versa. The determination is made by comparing the device coordinates of the upper left-hand corner and lower right-hand corner of the image with the device coordinates of the beginning and end points of the mouse movement, provided as arguments "fromX," "fromY," "toX," and "toY." If so, then on lines 8–11, mouseMove computes the image-relative coordinates corresponding to the arguments and stores them into local variables "imageFromX," "imageFromY," "imageToX," and "imageToY." Then, in the while loop of lines 14–23, mouseMove iterates through the AreaInfo objects linked to the Image object to which the mouseMove call is directed to find any active region into which the mouse was moved or from which the mouse was moved. For each such active region found, as determined by mouseMove on lines 16–17 or 19–20, then the appropriate action is invoked on lines 18 or 21.

Implementations for the Image functions "isInside" and "display" are not provided. The Image function "isInside" is straightforwardly implemented, similar to the ImageArea function "isInside," given above, and the implementation of the function "display" is outside the scope of the current application.

Although the present invention has been described in terms of a particular embodiment, it is not intended that the invention be limited to this embodiment. Modifications within the spirit of the invention will be apparent to those skilled in the art. For example, the present invention may be implemented in many different computer languages with any number of different modular, functional, and data structure organizations. Different types of browser extension image viewers can be employed for displaying dynamic images, including ActiveX viewers, Netscape™ Plug In viewers, and viewers implemented by Java™ applets. Active regions may be described computationally in many different ways, and many different image-relative descriptions of active regions are possible. Different types of input operations can be associated with active regions, and active regions may overlap, unlike in the implementation described above, or may have more complex interactions. The techniques of the present invention can be used for display of various types of image-containing objects in addition to web pages, and the technique can be used or objects transmitted over communications medium other than the Internet and described in description languages other than HTML.

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description; they are not intended to be exhaustive or to limit the invention to the precise forms disclosed, obviously many modifications and variations are possible in view of the above teachings. The embodiments were chosen and described in order to best explain the principles of the invention and its practical applications and to thereby enable others skilled in the art to best utilize the invention and various embodiments with various modifications as are suited to the particular use contemplated. It is intended that the scope of the invention be defined by the following claims and their equivalents.

What is claimed is:

1. A method for associating an active region with a corresponding position within an image included in a page displayed by a browser running on a client computer, the method comprising:
    sending a request by the browser to a server for a description of a page that includes a specification of the image and an associated client-side image map, the client-side image map specifying a shape, size, and location of the active region within the image and specifying actions to be performed in response to input events directed to the active region;
    receiving from the server in response to the request a description of the requested page that includes an invocation of a viewer for displaying the image, the invocation including parameters that describe the image and the client-side image map;
    instantiating the viewer and passing to the viewer the parameters included in the invocation;
    storing by the viewer representations of active regions within the image in image-relative coordinates along with indications of the actions to be performed in response to input events directed to the active region; and
    when an input event is detected by the browser during display of the page,
        passing the input event by the browser to the viewer, and
        when the viewer determines that the input event was input to a position within the image corresponding to the active region, determining an action specified for performance in response to the input event to the active region and calling for performance of the determined action.

2. The method of claim 1 wherein the page displayed by the browser running on a client computer is a web page.

3. The method of claim 2 wherein the server runs on a server computer and a description of the web page is requested by the browser from the server and received by the browser from the server via the Internet.

4. The method of claim 2 wherein the server runs on the client computer and a description of the web page is requested by the browser from the server and received by the browser from the server via an inter-process communications medium within the client computer.

5. The method of claim 2 wherein the description of the web page received from the server in response to the request by the browser is a hyper-text markup language document.

6. The method of claim 2 wherein the image is an OpenPix image and wherein an invocation to a browser extension image viewer is included in the description of the web page.

7. The method of claim 2 wherein input events directed to the active region may include mouse-click, mouse-into, and mouse-out-from events, and actions to be performed in response to input events include display of a web page, display of an image, or launching of a software routine.

8. The method of claim 2 where image-relative coordinates represent the position of points within the image, a point within the image represented by a pair of coordinates, a first coordinate of the pair having a fractional value representing the ratio of a horizontal line segment to a horizontal dimension of the image with a first endpoint coincident with a vertical edge of the image and a second endpoint coincident with the point, the horizontal line segment perpendicular to the vertical edge of the image, the second coordinate of the pair having a fractional value representing the ratio of a vertical line segment to a vertical dimension of the image with a first endpoint coincident with a horizontal edge of the image and a second endpoint coincident with the point, the vertical line segment perpendicular to the horizontal edge of the image, the horizontal and vertical edges of the image intersecting at an origin having coordinates (0, 0).

9. The method of claim 2 further including:
    when a display altering input event is detected by the browser,
        passing a display altering input command by the browser to the viewer, and
        altering the display of the image by the viewer in accordance with the input command.

10. The method of claim 9 wherein display altering input events include a zoom input event and a pan input event.

11. A method for serving a description of a page from a server to a browser running on a client computer that requests the page, the description of the page provided to the browser by the server containing an invocation of a viewer, the invocation including parameters that specify an image included in the page and an active region within the image, the method comprising:
    receiving a request from the browser by the server for a description of the page that includes a specification of the image and an associated client-side image map, the client-side image map specifying a shape, size, and location of the active region within the image and that specifies actions to be performed in response to input events directed to the active region;
retrieving a description of the page;
determining the capabilities for viewing pages provided by the browser running on the client computer; and
when the browser, running on the client computer, is capable of accepting display altering commands from a user while displaying a page,
  parsing the description of the page to find the specification of the image and the client-side image map included in the page,
  substituting, in the description of the page, an invocation of a viewer for the specification of the image and the client-side image map included in the page, including in the invocation parameters that specify the image and the client-side image map, to create a transformed page description, and
  sending the transformed page description to the browser.

12. The method of claim 11 wherein the page requested from the server by the browser running on a client computer is a web page.

13. The method of claim 12 wherein the server runs on a server computer and a description of the web page is requested by the browser from the server and sent by the server to the browser via the Internet.

14. The method of claim 12 wherein the server runs on the client computer and a description of the web page is requested by the browser from the server and sent by the server to the browser via an inter-process communications medium within the client computer.

15. The method of claim 12 wherein the description of the web page retrieved by the server in response to the request by the browser is a hyper-text markup language document.

16. The method of claim 12 wherein the image is an OpenPix image and wherein an invocation to a browser extension image viewer is included in the description of the web page.

17. The method of claim 12 wherein input events directed to the active region may include mouse-click, mouse-into, and mouse-out-from events, and actions to be performed in response to input events include display of a web page, display of an image, or launching of a software routine.

* * * * *